United States Patent [19]

Monti et al.

[11] 4,410,157
[45] Oct. 18, 1983

[54] PHOTOGRAPHY STAND SYSTEM

[76] Inventors: Carmel S. Monti, 2010 Medford Rd., No. D33, Ann Arbor, Mich. 48104; Arthur Eisenkramer, 67 Litchfield Rd.; Carl Yurdin, 2 Harborview Rd., both of Port Washington, N.Y. 11050

[21] Appl. No.: 125,599

[22] Filed: Feb. 28, 1980

[51] Int. Cl.$^3$ .................... F16M 11/38; A47G 29/00
[52] U.S. Cl. .................... 248/125; 52/726; 248/309 R; 248/168; 248/297.2; 403/263; 403/381; 403/3
[58] Field of Search .................... 248/168, 558, 297.2, 248/188, 309 R, 125; 403/3, 4, 157, 68, 263, 381; 52/721, 726, 36, 27, 239, 282

[56] References Cited

U.S. PATENT DOCUMENTS

| 298,257 | 5/1884 | Vail | 248/168 |
|---|---|---|---|
| 464,471 | 12/1891 | Brown | 248/188 |
| 1,155,243 | 9/1915 | Tordahl | 52/710 |
| 2,297,927 | 10/1942 | Whitman | 248/186 |
| 2,612,695 | 10/1952 | Schneider | 248/168 |
| 2,633,319 | 3/1953 | Musial | 248/188 |
| 3,250,584 | 5/1966 | Tassell | 248/297.2 |
| 3,513,606 | 5/1970 | Jones | 248/297.2 |
| 4,009,550 | 3/1977 | Young | 52/726 |
| 4,163,537 | 8/1979 | Mourgue | 248/297.2 |

FOREIGN PATENT DOCUMENTS

| 543056 | 2/1932 | Fed. Rep. of Germany | 248/188 |
|---|---|---|---|
| 864145 | 1/1953 | Fed. Rep. of Germany | 52/726 |
| 2256125 | 4/1974 | Fed. Rep. of Germany | 248/168 |

*Primary Examiner*—Price C. Faw, Jr.
*Assistant Examiner*—Henry E. Raduazo
*Attorney, Agent, or Firm*—Krass, Young & Schivley

[57] ABSTRACT

A photography stand system is disclosed assembled from elongate support members into either a tripod or framework structure. The elongate support members form the legs of the camera tripod, each assembled to a tripod platform by mating engagement of fittings into tracks formed in the elongated support members in order to be height positionable. Cameras and various photographic accessories may be mounted to the platform and secured to any adjusted position along the length of each of the support members by coupling fittings including T-bolts fit within the tracks in each of the tripod legs. The support members may also be assembled in end-to-end relationship by a coupling element secured in each end of the support members, and erected into a framework with the camera and various accessories similarly positionable along the length of any of the support members.

15 Claims, 11 Drawing Figures

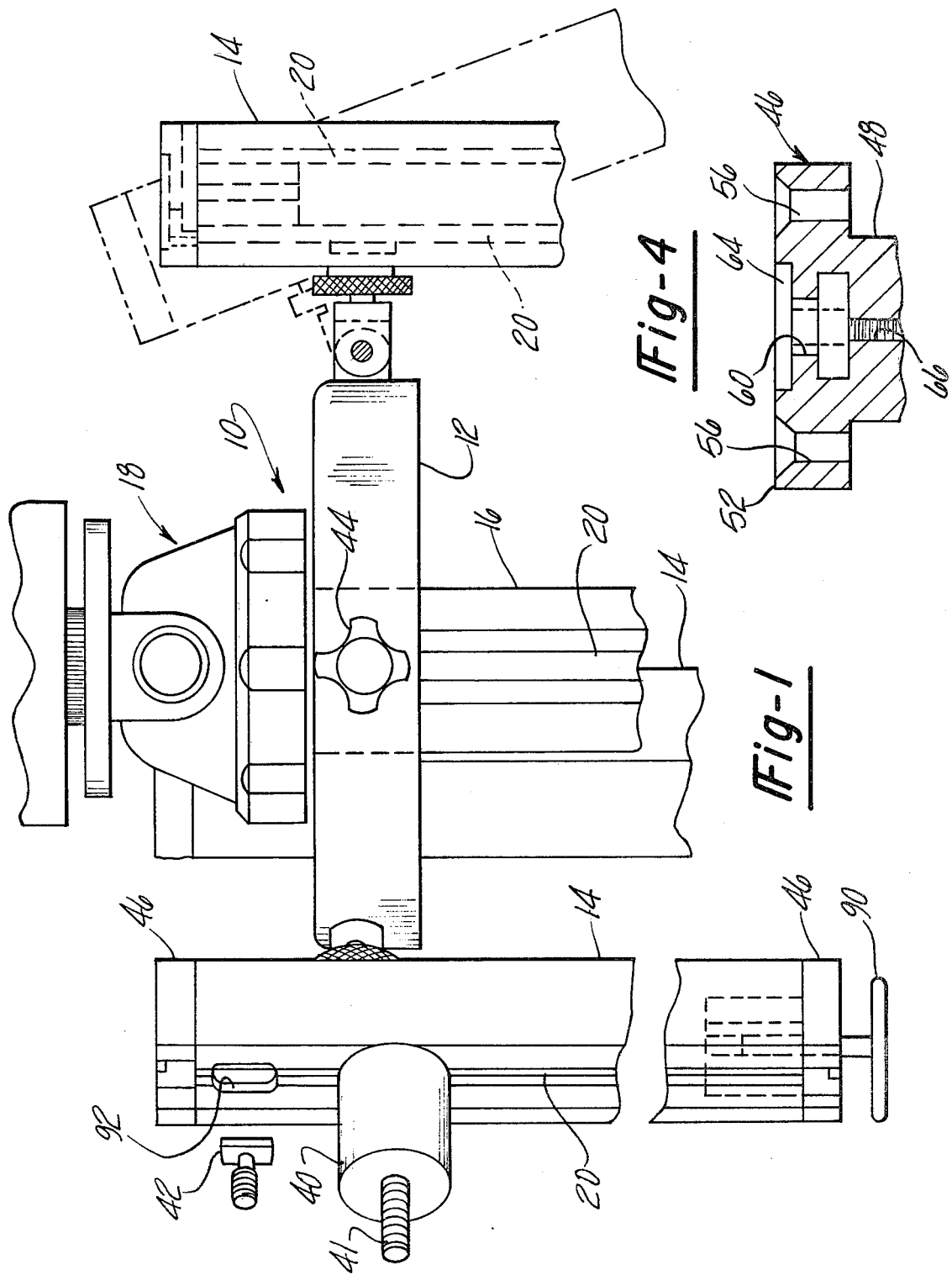

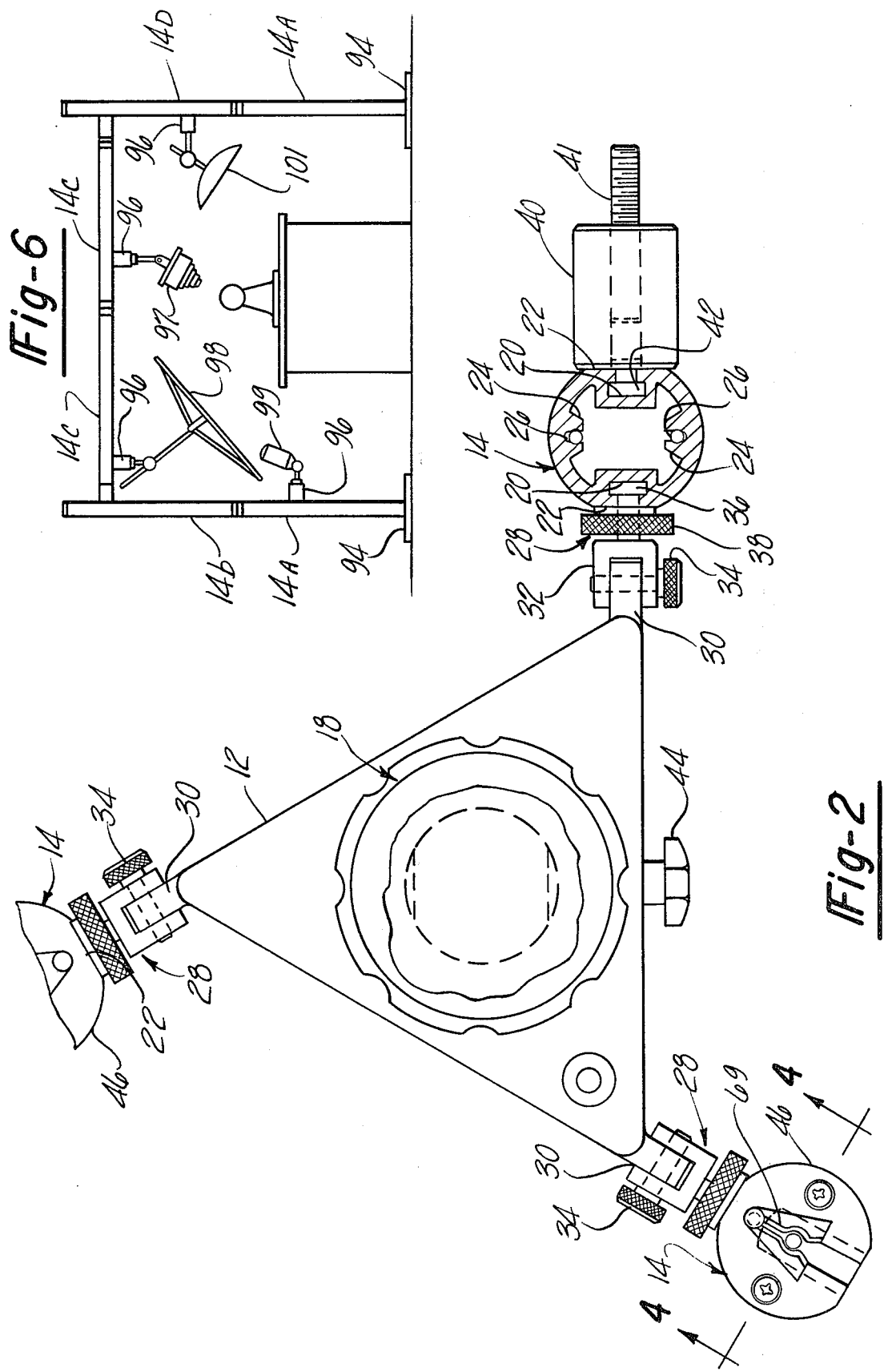

PHOTOGRAPHY STAND SYSTEM

BACKGROUND DISCUSSION

This invention concerns support structures and more particularly is related to stand systems for photography, i.e., for camera and accessory positioning supports. The most common form of support for cameras is the conventional camera tripod in which three legs are mounted to a central platform, which in turn receives a center post to which is mounted the camera supporting pan head. Accessories are often employed in taking photographs such as lights, parasols, screens, etc., each of which require their own supports. Also, the photographer desirably should be given maximum freedom in positioning the camera angle.

While the tripod legs telescope to a degree, this does not afford the photographer a complete range of freedom in selecting the position of the camera.

U.S. Pat. No. 2,297,927 discloses an arrangement in which the camera can be mounted to a lower portion of the center post which enhances the capability of the camera tripod but still does not enable maximum degrees of flexibility in selecting camera positions with respect to the subject matter.

While lights and/or other accessories can be clamped to the camera tripod legs, this would necessitate special clamping fixtures if the tripod support itself were to be employed as the accessory support.

It is of course important that the photographer have freedom in physically locating the camera accessories such as the lights, etc., in order that the desired arrangement of the photographer can be realized in order to achieve a desired effect.

In relatively more complex studio setups, a "monkey-bar" framework arrangement is provided including framework to which is mounted the camera and accessories. This is often used for photographing objects as for technical photography. These structures are elaborate and necessitate entirely different fixturing than the camera tripod support.

Accordingly, it is an object of the present invention to provide a photography stand system which affords the photographer maximum flexibility in the arrangement of the camera and other accessories in a legged stand such as a camera tripod.

It is a further object of the present invention to provide a photography stand system in which the tripod components can also be employed to erect other camera support configurations such as the aforementioned framework in which is employed the same components for securing the camera and accessories thereto.

It is yet another object of the present invention to provide componentry for such photography stand system which is interchangeable in the tripod stands with such framework and which provides relatively economical fixturing for securing the camera and accessories thereto while enabling maximum flexibility in the positioning of the camera and various photographic accessories.

It is yet another object of the present invention to provide such a camera stand system employing extremely simple, low cost components, which are readily assembled into various combinations.

SUMMARY OF THE INVENTION

These and other objects of the present invention, which will become apparent upon a reading of the following specification and claims, are achieved by a photography stand system assembled from elongate support members, each being formed with multiple tracks extending along the length thereof, such tracks being configured to receive T-bolts carried either by coupling members to which may be joined the camera or camera accessories allowing cameras and accessories to be positioned at any point along any of the support members. The support members are assembled by cooperation of T-members joined either to a tripod platform allowing telescoping and pivoting movement of the legs together. Or, alternatively, the end faces of the elongate coupling members are provided with end cap fittings which may be assembled in either reversible position of a T-bolt.

In one position, this enables end-to-end connection of the support members into vertical columns and in a reverse position the T-bolts are interfit into the support member side track to provide transverse assembly thereto. A snap-in spring retaining arrangement disposes the T-bolts with the threaded shanks extending outwardly to be utilized in the first instance by being received in a threaded bore in the end cap.

The elongate support members preferably are formed of lightweight metal extrusions formed with two or four oppositely located tracks extending substantially the full length thereof.

DESCRIPTION OF THE DRAWINGS

FIG. 1 is an enlarged fragmentary side elevational view of a camera tripod system assembled with elongate support members according to the concept of the present invention.

FIG. 2 is a fragmentary plan view of the camera tripod system shown in FIG. 1 illustrating the details of the attachment of the support members to the tripod platform as well as the coupling member utilized for mounting the camera and photographic accessories to the elongate members forming the legs of the camera tripod.

FIG. 4 is a transverse sectional view of an end cap fitting employed in the arrangement depicted in FIG. 3.

FIG. 6 is a side elevational view of a series of elongate support elements assembled into a framework type photography stand system illustrating the mounting of cameras and photographic accessories thereto.

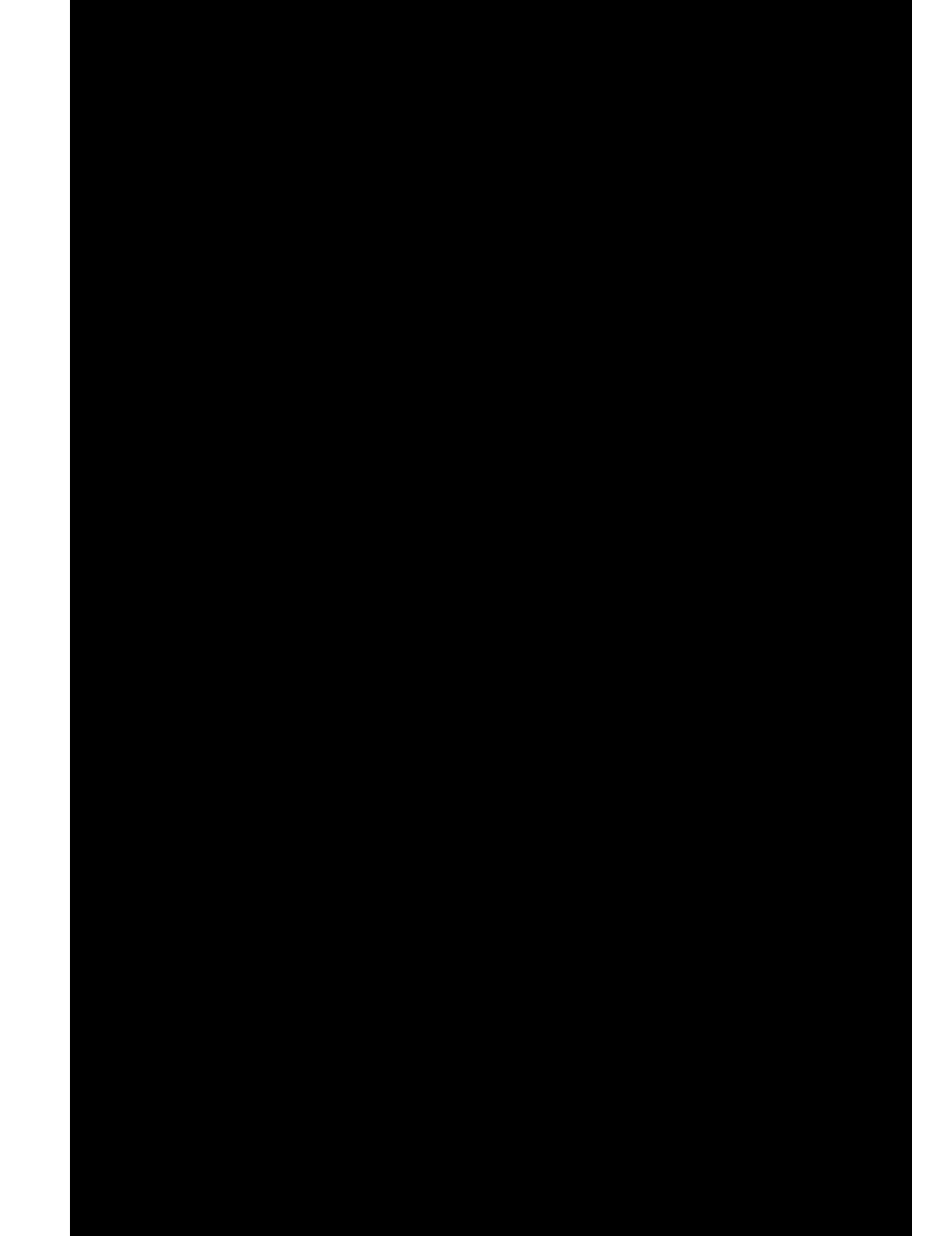

Figures 3, 5:
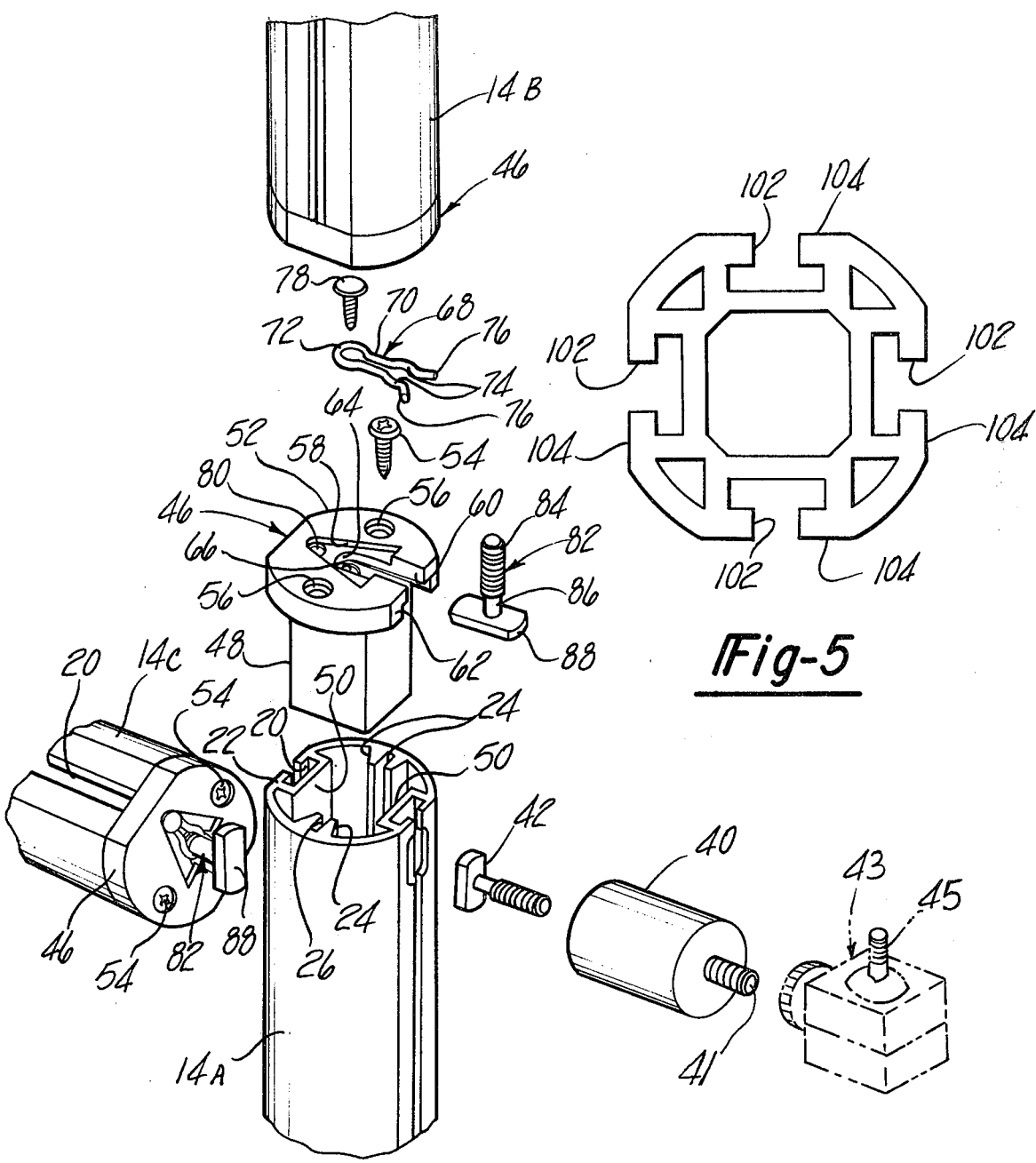
FIG. 3 is an exploded perspective view of a series of support members in transverse and end-to-end relationship to each other illustrating the mounting components therefor as well as the mounting components for clamping a camera or accessories to one of the support members.
FIG. 5 is a transverse cross sectional view of an alternate form of an elongate support member employed in the photographic stand system according to the present invention.

Alternatively, the T-bolt 82 may be mounted as seen in FIG. 3 with the threaded section 84 being threaded into the bore 66, for purposes to be described hereinafter.

In the tripod application, the end cap 46 in the upper region is not equipped with T-bolts, but merely provides a smooth finishing end cap for the upper end of the elongate support member 14. The lower end cap 46 receives feet 90 threaded into the threaded bore 66.

Each of the T-slots 20 is formed in the upper end with widened sections 92 such as to enable the T-bolts to pass thereinto in order to assemble the T-bolts into the slots with the end caps 46 in position.

The mounting of T-bolts 82 in the end caps 46 affords either end-to-end or transverse assembly of elongate support members 14 to each other as illustrated in FIG. 3, which elongate support members 14A and 14B are secured together in endwise relationship and elonfate support member 14C is assembled as shown in position for assembly in transverse relationship.

An endwise connection is provided with the T-bolt 82 snap fit into the end cap 46 assembled into the lower elongate support member 14A. Thus, the threaded section 84 may be received in the threaded bore 66 of the end cap 46 associated with the upper elongate support member 14B.

Rotation therebetween draws the elements into secure abutment with the faces of the flange portion in firm contact to provide the endwise connection.

The transverse connection is provided by the T-bolt 82 in reverse position with the head portion 88 outward which can be received within the T-slot 20 of the elongate support member 14A and clamping thereinto provided by rotation of the crossing or transverse elongate support member 14C until the end face of the end cap 46 is provided in secure abutment with the flat 22 associated with T-slot 20 in any adjusted position.

Accordingly, the elongate support members 14 may be utilized to erect a framework such as to provide a "monkeybar" studio set up.

Advantageously, an elongate support member 100 (FIG. 5) is employed in which T-slots 102 are provided on each of the four sides thereof, each having flats 104 on respective sides in alignment with a respective T-slot 102 in order to allow a three-dimensional framework to be erected.

In order to tighten T-bolts 82 mounted on either end of an elongate support member 14, it is desirable to provide a coupling at one end enabling independent rotation to clamp either T-bolt 82.

A suitable coupling 106 is depicted in FIGS. 7 through 10. Coupling 106 includes a pair of coupling cylinders 108 and 110, each rotatable on either end of a connector pin 112, axially secured thereon by cross pins 114 and 116 mating with arcuate grooves 118 and 120, respectively, formed on either end of the connector pin 112. Cross pins 114 and 116 are disposed in cross drilled openings in each of the cylinders 108 and 110, each aligned with arcuate grooves 118 or 120 with the cylinders 108 and 110 axially spaced with a predetermined clearance therebetween.

Disposed in this clearance space is a steel looking disc 122 which is rotatable by manipulation of a formed lever 124 between lock and unlock positions. In the unlocked position, a series of arcuate ramps 126 punched out of the disc body 128 along a circle centered on the disc body 128, are aligned with a series of correspondingly shaped and located recesses 130 formed in the end face of one of the cylinders 110. Thus, in this position, the locking disc 122 exerts no force on the other of the cylinders 108 tending to resist relative rotation.

In the locked position, the locking disc 122 is rotated to a position in which the arcuate ramps 126 have been rotated out of the recesses 130, camming the locking disc 122 axially away from the one cylinder 110.

The predetermined axial clearance is such as to result in the locking disc 122 frictionally engaging the end face of the other cylinder 108, creating a snubbing lock and preventing relative rotation between each cylinder 108 and 110.

Accordingly, one T-bolt 82 of a coupling 106 may be anchored in an end cap 46 of one of the elongate members and the other disposed in a T-bolt of a transversely extending elongate member. The end opposite the one end of the one elongate member is also provided with a T-bolt received into a T-slot of a second transverse elongate member. By utilizing the coupling 106 to anchor one of the T-bolts mating with the respective T-slots, independent tightening rotation may be executed to clamp both T-bolts in their respective T-slots. The coupling 106 may then be locked to preclude inadvertent rotation of the assembled elongate member due to the offset weight of a mounted camera or accessory.

Figure 11:
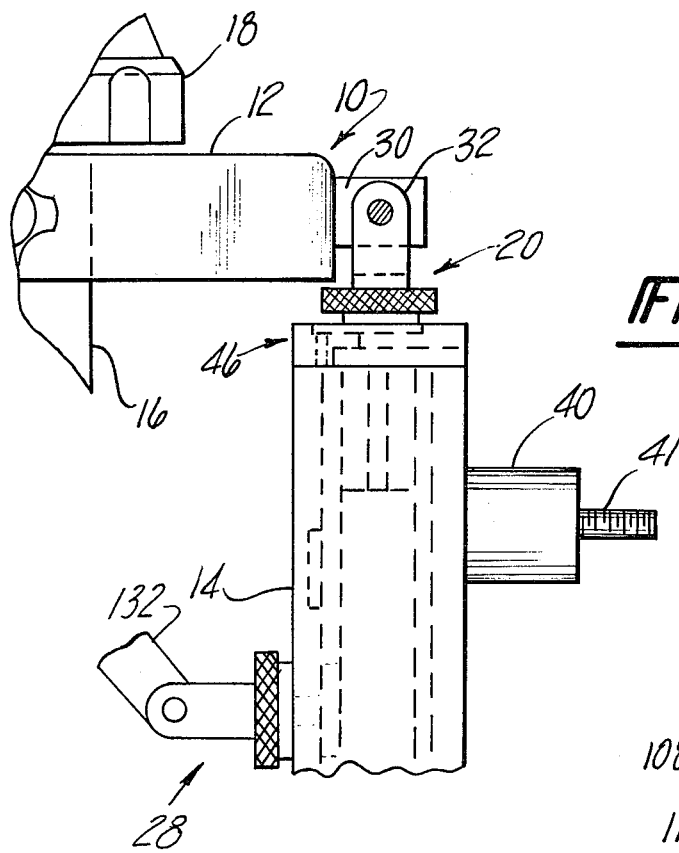
Figure 7:
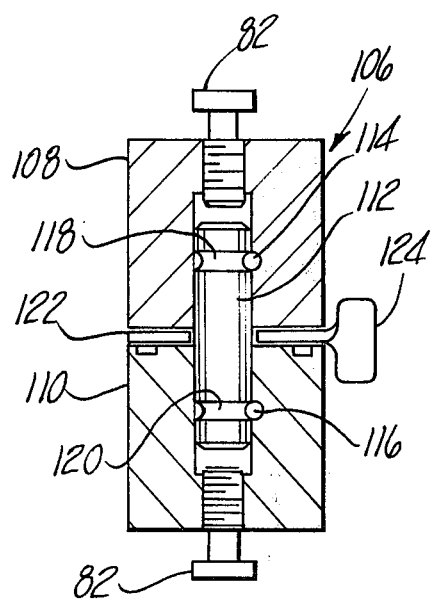
FIG. 7 is a partially sectional view of a special purpose coupling assembly adapted to be used in the camera tripod system according to the present invention for certain installations.
Figure 8:
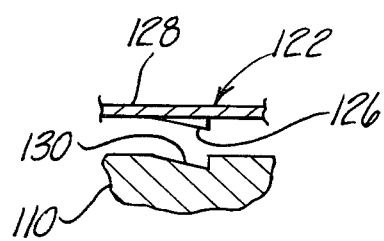
FIG. 8 is an enlarged sectional view of certain of the components of the coupling assembly shown in FIG. 7.
Figure 9:
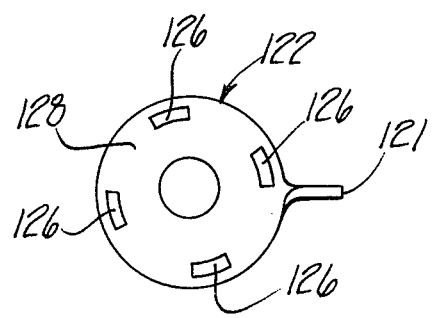
FIG. 9 is a plan view of the locking plate incorporated in the coupling system shown in FIG. 8.
Figure 10:
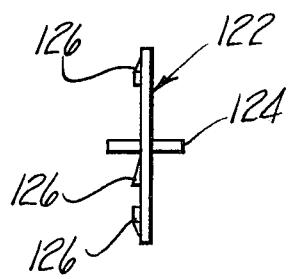
FIG. 10 is an edgewise view of the locking plate shown in FIG. 9.

Referring to FIG. 11, an alternate arrangement is depicted for assembling the elongate support members 14 to the platform 12 in providing a tripod stand 10. This arrangement may be utilized where length adjustment of the legs is not required, and comprises assembly by connecting the ends of elongate members to the projections 30. This is achieved by assembling the clamping assembly 28 to the end cap 46 as shown.

In order to provide bracing of each of the legs, a brace member 132 may be provided for each leg pinned at one end to the center post 16 and at the other to the clevis of a clamping assembly 28 disposed in the inside T-slot of the respective elongate support member 14. This enables a height adjustment of the tripod.

The embodiments of the invention in which an exclusive property or privilege is claimed are defined as follows:

1. A photograph stand system comprising a plurality of elongate support members, each of said elongate support members having at least one T-slot extending along substantially the entire length thereof; means for assembling and securing said elongate support members together in a support structure;
   as least one coupling sleeve including T-bolt threadedly received in said sleeve and having the T-portion disposed in said T-slot, each of said support elements further including a face portion extending along the length thereof adjacent said T-slot, whereby said coupling sleeve may be rotated towards said T-portion to clamp said sleeve and said T-portion on opposite sides of the face portion of the support member at any point along the length thereof, said coupling sleeve further including a threaded stud extending away from the sleeve for mounting fixtures for cameras or photographic accessories;
   whereby said photography stand system enables adjustable positioning of said coupling sleeve at points along the length of any of said elongate support members.

2. The photography stand system according to claim 1 which further comprises a platform, three of said support members, and means for mounting one end of each support member to the platform to form a legged stand.

3. The photography stand system according to claim 2 wherein said means for mounting each of said support members to said platform comprises clamp assembly means, each of said clamp assembly means mounted to one of said elongated support members at one end, said clamping assembly means including a T-bolt including head portion thereof disposed in said at least one slot in each of said respective elongate support members and further including means for clamping said T-bolts in said slots, whereby each of said elongate support members comprises a leg adjustable in length defined by the position of said T-bolts in said respective slots.

4. The photography stand system according to claim 3 wherein each of said clamping assembly means comprises a clevis mounted to said T-bolt and means pivotally mounting each of said clevises to said platform enabling swinging adjustable movement of each of said legs with respect to said platform.

5. The photography stand system according to claim 3 wherein each of said elongate support members is formed with at least two T-slots extending down the length thereof on opposite sides of each of said elongate support members serving as legs for the platform.

6. The photography stand system according to claim 4 further including a center post slidably mounted to said platform, said center post being formed with at least one T-slot extending down the length thereof, further including means for adjustably securing said center post to said platform by interengagement with said T-slot.

7. The photography stand system according to claim 1 wherein said means for mounting said plurality of elongate support members into said photography stand system includes means for mounting said elongate support members in end-to-end relationship therebetween and also in transverse relationship to provide such photography stand system.

8. The photography stand system according to claim 7 wherein each of said elongate support members includes end caps, each of said end caps being provided with transverse T-slots and means for alternatively mounting T-bolts on each of said end caps in each of two reversed positions, said means including a central threaded bore formed in said end caps, said transverse T-slot extending into registry with said threaded bore, and snap retainer means for securing said T-bolt in said T-slot in said central location thereof, whereby said end-to-end connection is provided by a T-bolt moved into said transverse T-slot in an end cap of one member and threaded into said threaded bore of the end cap of an endwise mating elongate support member; and, wherein said T-bolt in a reversed position enables transverse mounting by disposing the T-portion of said T-bolt into said longitudinal T-slot of one member and threading an opposite end of the T-bolt into the bore in the end cap of another support member.

9. The photography stand system according to claim 8 wherein said means for retaining said T-bolt in said T-slot comprises a wire formed into a pair of legs having oppositely located radius portions thereof having a smaller radius than the outside diameter of said T-bolt shank section, whereby said T-bolt may be slid into and secured therein by frictional engagement with said wire form.

10. The photography stand system according to claim 9 wherein said means for mounting said wire form to said end cap comprises a triangular shaped recess formed into said end cap and means mounting said wire form in said recess with said point of convergency with said wire form legs and said apex of said triangular recess in substantial alignment.

11. The photography stand system according to claim 7 wherein each of said elongate support members is formed with four longitudinal T-slots formed therein, each pair being aligned opposite each other about the axis of said elongate support member.

12. The photography stand system according to claim 2 wherein said means mounting each of said support members to said platform comprises clamp assembly means, each of said clamp assembly means mounted to one of said elongate support members at one end, each clamping assembly means including a T-bolt including a head portion, an end cap mounted to one end of each of said elongate support members; a T-slot formed in each of said end caps, said T-bolt head portion disposed in said slot in said respective end caps and further incuding means for clamping said T-bolts in said slots.

13. The photography stand system according to claim 3 wherein each of said clamping assembly means comprises a clevis mounted to said T-bolt and means pivotally mounting each of said clevises to said platform enabling swinging adjustable movement of each of said legs with respect to said platform.

14. The photography stand system according to claim 7 wherein said means for mounting said elongate support members in transverse relationship further includes a coupling mounted at at least one end of said elongate support member, said coupling including a pair of coupling members and means mounting said coupling members to be relatively rotatable while being relatively axially fixed; oppositely extending T-bolts, one each mounted to a respective coupling member with the head portion remote therefrom; locking means selectively operable to lock said coupling members against relative rotation.

15. A legged stand system comprising a plurality of elongate support members, each of said elongate support members having at least one T-slot extending along the length thereof;
  means for assembling said securing said elongate support members together into a legged support structure in which each of said elongate support members serves as legs;
  at least one coupling sleeve including a T-bolt threadedly received in said sleeve and having a T-portion disposed in said T-slot, each of said support elements further including a face portion extending along the length thereof adjacent said T-slot, whereby said coupling sleeve may be rotated towards said T-portion to clamp said sleeve and T-portion on opposite sides of the face portion of the support member at any point along the length thereof, said coupling sleeve further including means for mounting fixtures thereto; and
  end caps for said support members having a face with a slot for receiving the T-portion of the T-bolt and a threaded bore in the face for engaging a threaded portion of the T-bolt;
  whereby said legged stand system enables adjustable positioning of said coupling sleeve at points along the length of any of said elongate support members and connection of said support members together in an end-to-end relationship by the use of said T-bolts in cooperation with the end caps.

* * * * *